United States Patent [19]
Reid et al.

[11] 4,254,743
[45] Mar. 10, 1981

[54] COMBUSTION ENGINE

[76] Inventors: Allen F. Reid, 4736 Reservoir Rd., Geneseo, N.Y. 14454; Albert H. Halff, 3636 Lemmon Ave., Dallas, Tex. 75219

[21] Appl. No.: 864,394

[22] Filed: Dec. 27, 1977

[51] Int. Cl.³ .................... F02B 75/04; F02B 75/32
[52] U.S. Cl. ........................... 123/48 B; 123/78 E; 123/197 AC
[58] Field of Search ............ 123/78 F, 78 E, 78 R, 123/78 B, 78 BA, 197 A, 197 AB, 197 AC, 48 R, 48 A, 48 B, 193 P

[56] References Cited

U.S. PATENT DOCUMENTS

| | | | |
|---|---|---|---|
| 460,642 | 10/1891 | Kitson | 123/78 F |
| 887,633 | 5/1908 | Heginbottom | 123/48 B |
| 1,162,710 | 11/1915 | Powell | 123/78 F |
| 1,386,114 | 8/1921 | Jedrzykowski | 123/78 E |
| 1,430,491 | 9/1922 | Calcaterra | 123/78 B |
| 1,599,319 | 9/1926 | Crowe | 123/78 F |
| 1,875,180 | 8/1932 | Rider | 123/78 E |
| 1,987,661 | 1/1935 | Blauvelt | 123/78 F |
| 3,686,972 | 8/1972 | McWhorter | 123/78 E |
| 4,078,450 | 3/1978 | Valletos | 123/78 E |

FOREIGN PATENT DOCUMENTS 301919  8/1916  Fed. Rep. of Germany ......... 123/78 F

*Primary Examiner*—Charles J. Myhre
*Assistant Examiner*—Carl Stuart Miller
*Attorney, Agent, or Firm*—Alexander C. Wilkie, Jr.

[57] ABSTRACT

An improved internal combustion engine and method of operation are disclosed. A method and a means are described for conserving mechanical energy in the engine cylinder during the combustion portion of the engine cycle by automatically adjusting the engine cylinder volume.

2 Claims, 7 Drawing Figures

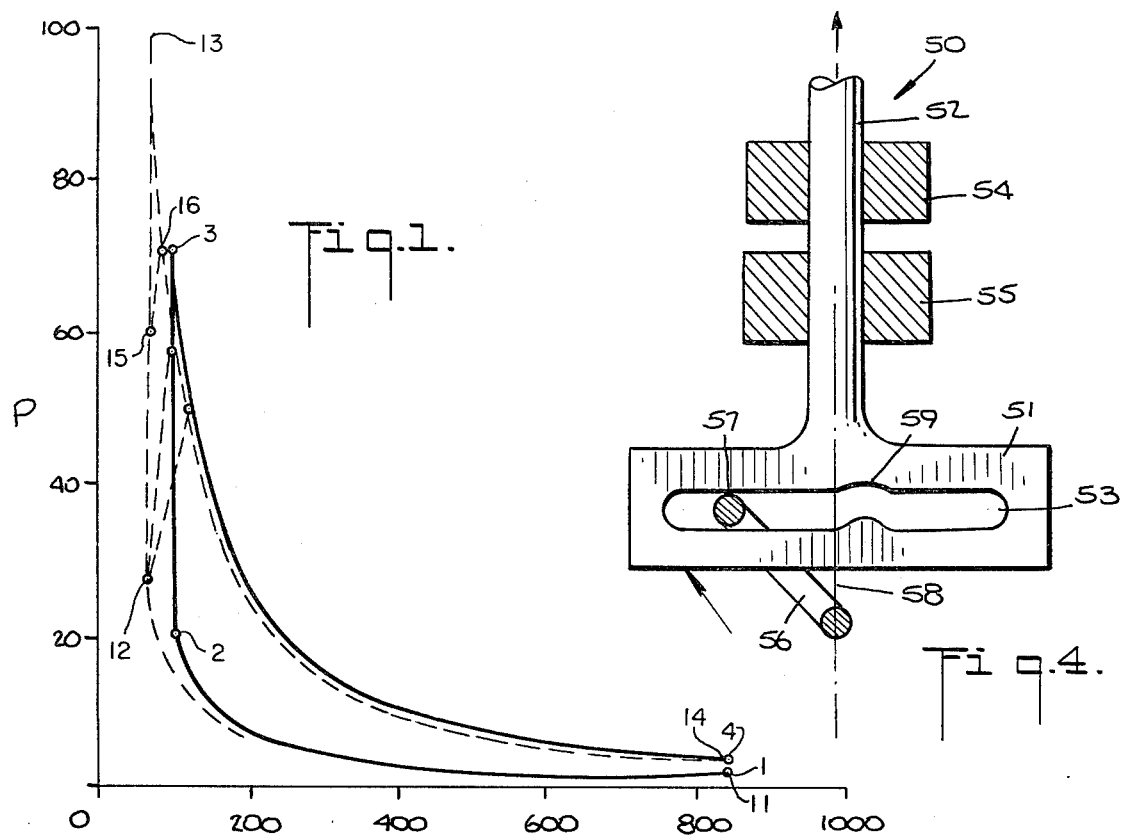
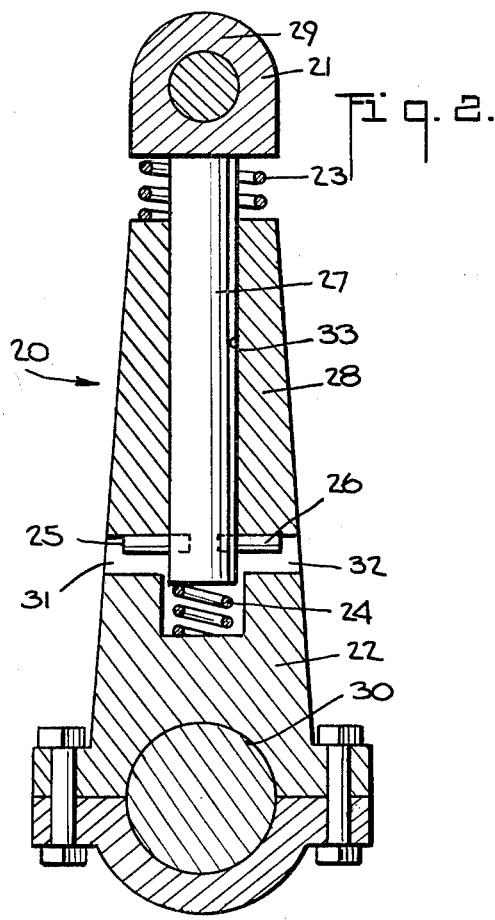
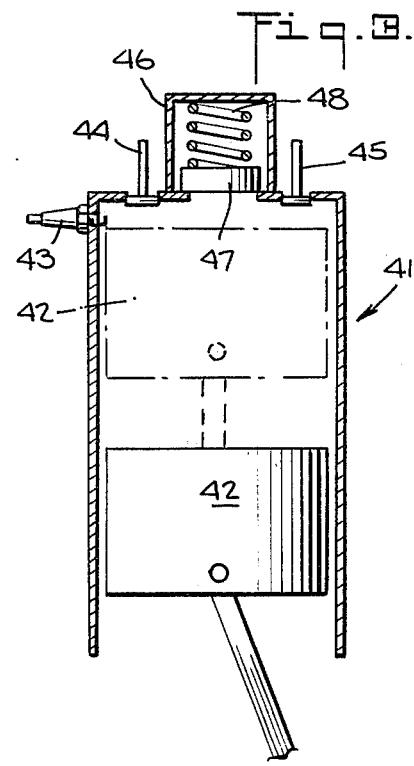

COMBUSTION ENGINE

BACKGROUND OF INVENTION

The present invention relates to internal combustion engines and more particularly to an improved engine structure and method of operation for increasing the efficiency of operation. In present internal combustion engines, the temperatures and pressures within the engine cylinders reach excessive amounts during portions of the engine cycle resulting in an inefficient over-all operation. By use of the apparatus and the method of the present invention, the temperatures and pressures are controlled and an increased engine efficiency results. This is done by apparatus which adjusts the effective volume of the engine cylinder during critical portions of the combustion cycle by means which will be described hereinafter.

Accordingly, the object of the present invention is to provide a more efficient internal combustion engine.

Another object of the present invention is to provide an improved method of operation for internal combustion engines.

Another object of the present invention is to provide means for increasing the mechanical efficiency of internal combustion engines, by increasing the effective cylinder volume during portions of the engine cycle.

Another object of the present invention is to improve the mechanical efficiency of internal combustion engines by keeping cylinder pressures and temperatures below critical performance limits.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF DRAWINGS

FIG. 1 is a diagramatic illustration of the cylinder pressure volume relation for the improved apparatus and method.

FIG. 2 is a vertical sectional view of an engine with connecting rods employing the efficiency adjusting means in accordance with the present invention.

FIG. 3 is a vertical sectional view of an engine cylinder having another embodiment of the cylinder volume adjusting means in accordance with the present invention.

FIG. 4 is a vertical sectional view of a coupling between an engine connecting rod and the engine crankshaft in accordance with the present invention.

DESCRIPTION OF THE PREFERRED EMBODIMENT

Figure 5C:
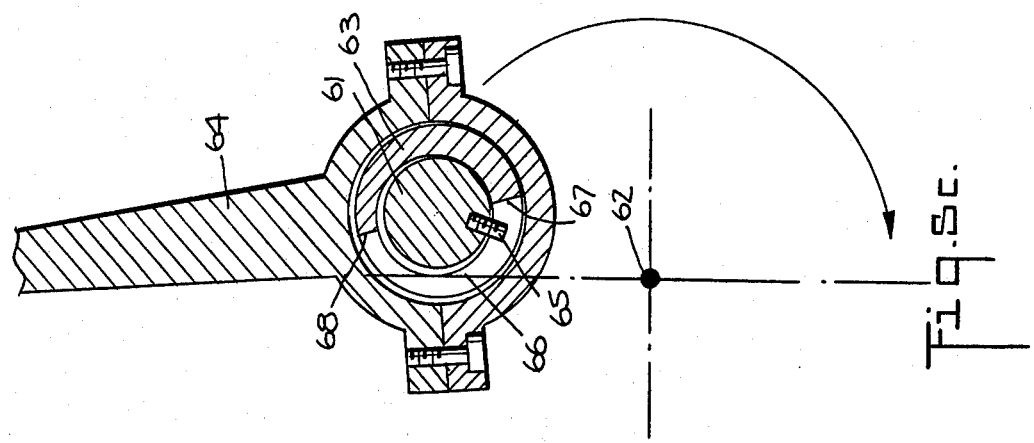
FIGS. 5A and 5C are vertical sectional views of a coupling means between a connecting rod and a crankshaft in accordance with the present invention.

Spark-ignition internal combustion engines are commonly used both for stationary and vehicular power. With other conditions the same, the efficiency of these engines increases with an increase in compression ratio, i.e; the ratio of the volume of gases in a cylinder before compression to the volume after maximum compression. A practical limitation on the compression ratios which may be used are the excessively high pressures and temperatures occurring during the combustion of the fuel in the cylinder. This results in end-gas detonation, commonly called combustion knock. After the electric spark for ignition, there is an ignition-delay period which is followed by the spread of the combustion flame from the spark through the gases in the cylinder. The heat of the combustion from the flame increases the temperature and pressure not only in the burned-gas region but also in the regions not yet reached by the flame, i.e; the "end-gas". If the temperature and pressure of the end-gas get too high, the end-gas will explode violently before the flame reaches it, thereby propelling a pressure-wave at super-acoustic velocity to the opposite wall and back and forth giving the combustion knock. Not only will this reduce the engine performance, but the extremely high rate of pressure rise can also damage the engine either directly or by scouring the necessary lubricant films from cylinder surfaces. Although some antiknock improvements have been made in fuels, the limitations still exist and are still important.

The application of the above general principals will now be described in the operation of the well known four cycle internal combustion engine. These engines operate in the following general manner:

The operation of a spark-ignition internal combustion engine conventionally follows a series of four processes known as the Otto cycle. The theoretical cycle is never attained in practice, but it is approached closely enough in modern four-stroke cycle engines so that it may be used to evaluate modifications. The four processes in the theoretical cycle are: (a) reversible adiabatic compression, (b) constant volume heat addition, (c) reversible adiabatic expansion, and (d) constant volume heat rejection—returning the gas system to its original condition. In a cylinder of a gasoline engine these are represented respectively by (a) the compression piston stroke, (b) combustion of the fuel, (c) the expansion (power) piston stroke and (d) the exhaust and recharge of gases in the cylinder.

A plot of the pressure-volume relationships in a theoretical Otto cycle A is presented in the solid lines in FIG. 1. Proceeding clockwise, point 1 represents base conditions; point 2, the status after compression; point 3, the status after heat addition, point 4, the status after expansion; point 1, the status again after heat rejection. Paths 1-2 and 3-4 follow the equation $PV^k =$ constant; for paths 2-3 and 4-1, V is constant. Quantitatively, the plot represents a typical system with a piston displacement volume of 750. ml. per stroke, a compression ration $V1/V2 = 9.0$, combustion heat addition of 300 calories, and a gas charge having a base temperature of 21° C. with a heat capacity at constant volume of 0.1715 calories per gram and $k = 1.33$.

The amount of mechanical work produced in the cycle is measured by the area enclosed by the solid lines on the plot. The paths 1-2 and 3-4 are decided by their points of origin and termination; thus attention should be directed to the terminal volume values if there is concern for increasing the area, i.e.; the mechanical work output.

In FIG. 1, the dashed lines represent a second Otto cycle B differing only form the cycle A by a change in compression ratio $V1/V2$ to 12.0, with point 11 representing base conditions, point 12, status after compression; point 13, status after heat addition; and point 14, status after expansion. The area enclosed by cycle B is larger than from cycle A, and thus represents a greater mechanical efficiency from the same heat energy input.

On the plots of FIG. 1, the temperatures do not show; however the temperatures increase and decrease with respective increases and decreases in pressure. Table 1 presents pressure, volume, and temperature values for the process end points of both cycles. If the assumption is made that cycle A produces the highest temperature and pressure compatible with insignificant combustion knock and practical operation, it is immediately evident why cycle B is not used, even though it has a higher calculated efficiency.

TABLE 1

Volume, pressure, temperature relationships for the internal combustion cycles represented in FIG. 1.

| Cycle Point | V (ml.) A | V (ml.) B,C | P (9atm.) A | P (9atm.) B,C | T (°C.) A | T (°C.) B,C |
|---|---|---|---|---|---|---|
| 1, 11 | 844 | 818 | 1.00 | 1.00 | 21 | 21 |
| 2, 12 | 94 | 68 | 18.59 | 27.24 | 334 | 394 |
| 3, 13 | 94 | 68 | 70.48 | 98.67 | 2029 | 2143 |
| 4, 14 | 844 | 818 | 3.79 | 3.79 | 842 | 842 |
| 15 | | 68 | | 58.74 | | 1166 |
| 16 | | 91 | | 70.48 | | 2029 |

The above described relationships between the cylinder gas volumes and gas pressures is relevant to the mechanical improvements to be described below because these improvements provide for critical adjustments of the gas volumes within the cylinder with a related effect on the cylinder temperatures. Several means are described below for an automatic control of the cylinder volume during critical portions of the engine combustion cycle.

The invention further described below provides for the conservation of a large portion of the mechanical energy added in cycle B while keeping the temperature and pressure from rising above those of cycle A. Referring to the dashed plot of cycle B in FIG. 1: as temperature and pressure are rising on path 12-13, provision is made to increase the volume enough to keep temperature and pressure from rising too high. On the plot, this volume increase is shown as dashed line 15-16. The area enclosed by the new cycle C, 11-12-15-16-14-11, is greater than that of cycle A and represents a greater mechanical efficiency. At the same time, as indicated in Table 1, temperature and pressure do not exceed those of cycle A. It is quite possible that point 15 may be appreciably higher than represented in FIG. 1, while still remaining lower than point 16 and thereby increasing the efficiency of operation.

Although the increase in mechanical energy obtained in cycle C may appear small, there are mechanical losses which would be the same for either cycle A or cycle C in actual use, thus amplifying the importance of the difference so that the net mechanical energy production from cycle C would be proportionally greater than from cycle A by a significant fraction.

FIG. 2 illustrates one means for accomplishing a revised combustion cycle in accordance with the above explanation. Thus, FIG. 2 illustrates a rod 20 for connecting a conventional crankshaft to a conventional piston in an internal combustion engine.

In FIG. 2, 21 and 22 are separate members of the connecting rod formed of a metal appropriate for connecting rod use; 23 and 24 are compression springs; and 25 and 26 are studs. The members are assembled as illustrated with the shaft 27 of member 21 inserted into an aperture 28 in member 22 and with the pressing springs 23 and 24 between the appropriate surfaces of members 21 and 22. The members 21 and 22 are held together by studs 25 and 26 which prevent bearing surface 29 of member 21 from moving further than a predetermined distance from the bearing surface 30 of member 22, but which permit surfaces 29 and 30 to move slightly closer as the studs 25 and 26 move in slots 31 and 32 in the member 22. The slots 31 and 32 also facilitate lubrication of the sliding surface 33 between shaft 27 and the aperture 28.

The assembled rod 20 is connected to a piston by the usual coupling pin through bearing 29 and is connected to a crank arm at the bearing surface 30. The springs 23 and 24 press apart the members 21 and 22 with enough force so that the rod 20 is completely extended at all times except during the final period of combustion. Referring to cycle C of FIG. 1 for the sequence of operation; the rod 20 remains fully extended to point 15; then it shortens progressively by amounts proportional to additional pressure until it reaches point 16. From that point as the power stroke continues along 16-14, the rod 20 lengthens in response to a reduction in cylinder gas pressure and becomes fully extended again at a pressure equal to that of point 15.

The amount of shortening with pressure is small, for example, in the example cited of cycle B, the volume increase from the maximum shortening is 23 ml. With a typical 10 cm. diameter engine cylinder bore, the shortening would be only about 3 millimeters.

Another means for providing the desired change in cylinder volume during the combustion portion of the engine cycle is illustrated in FIG. 3. FIG. 3 illustrates an engine utilizing conventional pistons 42 which are connected by the usual piston rods 40 to a conventional crankshaft. The volume adjusting means in this embodiment is included in the upper portion of the engine cylinder 41.

In the cylinder 41 illustrated in FIG. 3, the piston 42 is shown in two positions. The cylinder 41 has the usual spark plug 43, exhaust valve 44 and intake valve 45. An auxiliary cylindrical chamber 46 opens into the cylinder 41 and is closed by a piston 47 by pressure from a compression spring 48. There is a negligible leakage of gases between the walls of cylinder 46 and piston 47. The spring 48 presses against the piston 47 with enough force so that the cylinder 46 is completely closed at all times except during the final period of combustion. Referring to cycle C of FIG. 1 for the sequence of operation, cylinder 46 remains completely closed to point 15 and then piston 47 is forced progressively back by amounts proportional to additional pressure until the volume reaches point 16. From that point as the power stroke continues along 16-14, the piston 47 returns in response to the reduction in cylinder 41 gas pressure and completely closes the cylinder 46 again at a pressure equal to that of point 15.

In some instances it may be appropriate to place the auxiliary chamber in the piston 42, possibly permitting easier lubrication.

A further embodiment of the modified internal combustion engine is illustrated in FIG. 4. In this embodiment, a modified coupling 50 is employed between a conventional crankshaft 56 and an engine piston rod 52. The coupling 50 comprises an especially shaped yoke with a slot 53. The rod 52 moves longitudinally in bearings 54 and 55 while being driven by the crankshaft 56 rotating clockwise with a crank arm 57 moving in the slot 53. At the other end of rod 52, a piston, not shown, is attached. As the crankshaft 56 rotates, the piston is pushed farther into its containing cylinder until the crank arm 57 reaches its zenith, represented by the center line 58, the position of "inner dead center". Immediately thereafter, the crank arm 57 reaches a dip 59 in the slot 53 thereby pulling the piston rapidly back.

In a typical case the crank arm 57 reaches the deepest point of dip 59 at about 10° to 12° of rotation beyond inner dead center and has returned out of the dip 59 at about 26° beyond inner dead center. Referring to cycle C of FIG. 1 for the sequence of operation and relating the crank arm 57 rotation to the combustion lag in actual use: there is a spark ignition about 40° before the crank arm 57 reaches the inner dead center. Next an ignition lag and then pressure buildup occurs as the crank arm 57 approaches and reaches the inner dead center line 58 corresponding to the point 15 of cycle C in FIG. 1.

The crank arm progression to the deepest point of dip 59 is coincident with the combustion increase of pressure to its greatest value and corresponds to the line 15–16, and further progression of the crank arm 57 to the end of the dip 59 and finally to its nadir corresponds to the line 16–14.

Figure 5B:
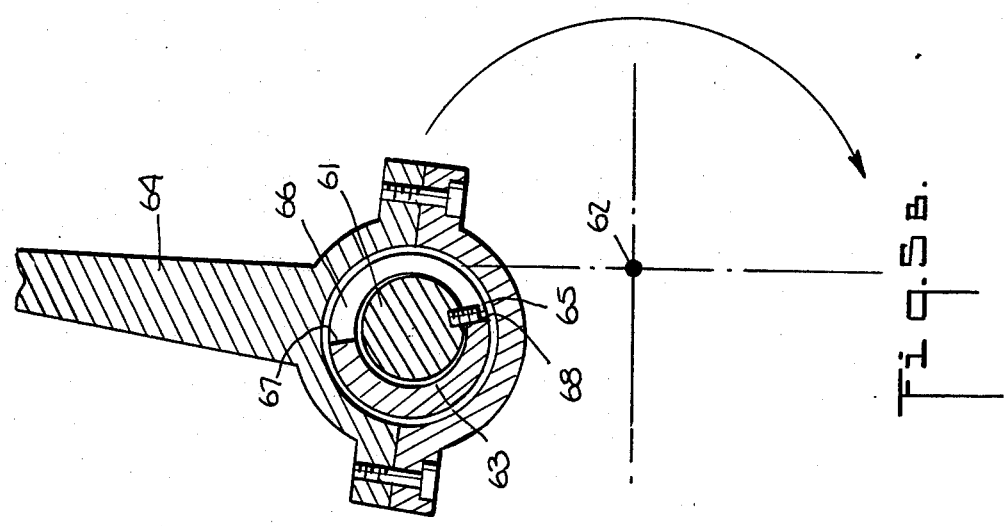
Figure 5A:
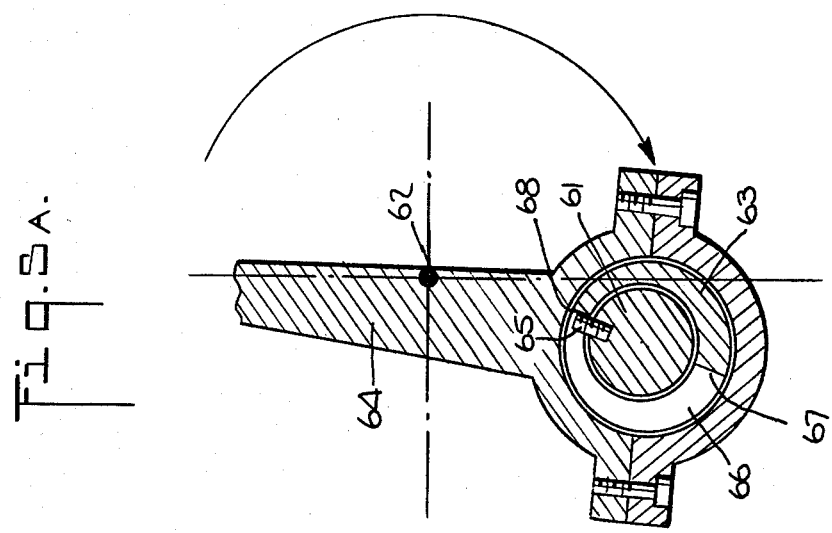

Another means for operating an internal combustion engine in accordance with the method of the invention is illustrated in FIGS. 5A through 5C. This further embodiment is also a means whereby the piston of the internal combustion engine is first moved to full compression and then is immediately retracted to provide an increased volume in the cycle during a portion of the combustion.

The structure of FIGS. 5A through 5C utilizes a cylindrical sleeve 63 positioned between the crank arm 61 bearing surface and the connecting rod 64 bearing surface with the sleeve 63 having its inside bore off-center to its outside surface. FIG. 5 is a diagram of this example showing the crank-sleeve-connecting rod assembly 61,63,64 in three positions sectioned perpendicular to the axis of rotation of the crank arm 61. In FIG. 5 the crank arm 61 rotates clockwise about a center of rotation 62. It is rotatably connected to sleeve 63 which is in turn rotatably connected to connecting rod 64 which is for a piston, not shown. Fixed in crank-arm 61 is a stud 65 which courses in a circumferential slot 66 in sleeve 63. The clockwise rotation of sleeve 63 on crank-arm 61 is limited by the end 67 of the slot; and the counterclockwise rotation is limited by the end 68 of the slot. The bearing surfaces at the inside of sleeve 63 are slightly off-center to the bearing surfaces at the outside of sleeve 63 in a direction 67–68 with the surfaces being closest at 68 and farthest at 67.

FIG. 5A diagrams the assembly at the beginning of the compression stroke; FIG. 5B diagrams the assembly near the end of the compression stroke, approaching inner dead center marked by center line 69; and FIG. 5C diagrams the assembly just after inner dead center. In FIG. 5A, the thin side of sleeve 63 is superior as a consequence of the cylinder gas pressure providing downward force on rod 64. As crank arm 61 progresses clockwise toward the position of B, this downward force would tend to maintain the thin side uppermost through counterclockwise rotation of sleeve 63 on arm 61; but this counterclockwise rotation is prevented by stud 65 against the end 68 of slot 66. Clockwise rotation of sleeve 63 on arm 61 is prevented by the downward force of rod 64, since such rotation during the compression stroke would wedge rod 64 farther upward. As a consequence, during the compression stroke from position A to position B, sleeve 63 does not rotate on arm 61; and rod 64 is raised to its highest point at inner dead center from the cumulative effect of the thickest portion of sleeve 63 on the highest position of rotation of arm 61.

Immediately after inner dead center, the downward force of rod 64 acts to start clockwise rotation of sleeve 63 on arm 61, since clockwise rotation will now decrease the thickness of the upward portion of the sleeve. Such rotation is unimpeded by stud 65 and will continue rapidly until the thinnest portion of sleeve 63 opposes the force of rod 64. This is diagrammed in FIG. 5C. The retraction of rod 64 and its attached piston increases the gas volume to keep the temperature and pressure below selected limits.

The clockwise progression of arm 61 continues toward position A with counterclockwise rotation of sleeve 63 on arm 61 to keep the thinnest part of the sleeve opposing the downward force of rod 64 until end 68 of slot 66 reaches stud 65, as diagrammed in FIG. 5A.

It will be seen that the method in accordance with the present invention provides for a controlled increase of cylinder volume for the gases of combustion during the combustion cycle which is subsequently greater than the conventional volume change. A number of preferred means have been described for this purpose, however, it is clear that the theory of the method, as described, will be carried out by a number of varying mechanical means.

The relatively simple mechanical improvements described above perform the method to provide for a substantial increase in the efficiency of operation of internal combustion engines and thus for a comensurate saving in fuel consumption and in operating costs.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In an internal combustion engine the improvement comprising means for increasing the volume available to the cylinder gases for driving the engine piston at a given angle of crank rotation beyond the minimum volume position during the combustion in the first part of the power stroke with respect to the volume available to the cylinder gases at a corresponding angle of crank rotation in advance of the minimum volume position in the last part of the compression stroke, said means for increasing the volume comprising a cylindrical sleeve with an off-set center bore coupling the connecting rod to the engine crankshaft, said off-set center bore forming a thinning and then thickening sleeve cross-sectional area, said sleeve including a semi-cylindrical slot, and means postioned on said crankshaft to turn said thickest portion of said sleeve cross-sectional area of said cylindrical sleeve nearest to the cylinder head during the last part of the compression stroke while allowing a combustion force transmitted through the connecting rod to freely rotate the sleeve to position said thinnest portion of said sleeve cross-sectional area closest to the cylinder head during the first part of the power stroke.

2. The engine as claimed in claim 1 in which said means on said crankshaft comprises a stud.

* * * * *